Nov. 2, 1954  W. E. POHL  2,693,126
TRAVELING MATTE
Filed June 30, 1948  2 Sheets-Sheet 2

Inventor
Wadsworth E. Pohl
by Roberts, Cushman & Grover
Att'ys.

United States Patent Office 2,693,126
Patented Nov. 2, 1954

2,693,126

TRAVELING MATTE

Wadsworth E. Pohl, Los Angeles, Calif., assignor to Technicolor Motion Picture Corporation, Hollywood, Calif., a corporation of Maine Application June 30, 1948, Serial No. 36,117

9 Claims. (Cl. 88—16)

In the art of motion picture photography it is desirable to combine two original records such as separately photographed foreground and background action in order to produce on the motion picture screen an image which appears as if the foreground and background scenes had been photographed at the same time, although they have actually been photographed quite independently. This can be accomplished by means of so-called travelling mattes, the foreground action being printed with a background matte which obstructs light from passing through the background areas of the printed film and the background action being printed with a foreground matte which obstructs light from passing through to the foreground areas of the printed film.

Various ways have been proposed to obtain these mattes, many of which include the photographing of the foreground action against a plain, uniform or unpatterned backing. In black and white motion picture photography this backing may be dark or bright. The record of a foreground scene against such a plain and contrasting backing constitutes the starting basis for making silhouette records of background and foreground scenes respectively. Assuming for example that the foreground action has been taken against a black backing, the foreground negative is used to prepare a matte by making a positive print on high contrast film and developing this film to a high gamma so that the areas of the matte film which correspond to the background are opaque and the areas corresponding to the foreground are transparent. This background matte is then used to print a foreground matte which is opaque in the foreground area and transparent in the background areas so that when superposed over the background film in printing the background the foreground areas are protected and will not print.

In the art of color photography it has been proposed to make travelling mattes by combining negatives made by photographing appropriately colored backings with the foreground action. The color separation records proper can be used for making the mattes, or special matte records may be taken, either simultaneously or alternately with the color aspect records proper. In this field of color photography it has however been found to be exceedingly difficult to obtain adequate separation in the mattes between backing and foreground areas with sharp and sharply registered boundary lines between these areas, mainly because of inadequate saturation of the backing color resulting in inadequate density differences in the separation negatives. It has also been found very difficult to produce foreground records without matte lines representing registration discrepancies along the boundary between foreground and background areas. This was often found to be caused by lateral growth of the latent record during development which produces a matte that is larger around the edges than the record from which it was made. These matte lines which separate foreground and background scenes are unsatisfactory because they introduce an unnatural record element which distracts from the enjoyment of the picture.

Various techniques heretofore proposed for improving the above outlined travelling matte technique are very cumbersome particularly for purposes of color photography, and involve a comparatively large number of intermediate records, special cameras and printing methods without actually eliminating the above indicated disadvantages.

Objects of the present invention are to provide a travelling matte technique especially suited for color photography which results in mattes with adequate separation; to provide such a technique which eliminates for all practical purposes matte lines; and to provide a technique reducing the number of films necessary to produce travelling matte pictures, reducing the number of printing and developing steps and producing composite pictures which do not betray the fact that foreground and background actions were exposed separately. Further objects are to provide very intense yet economical illumination for backings used in making matte records; to provide a travelling matte technique for color cinematography employing a considerably reduced number of processing stages and auxiliary records, and employing the emulsions best suitable for picture records without incurring effects detrimental to proper matte matching and the satisfactory reproduction of fine detail in the matte boundaries; and to provide a technique of matte printing which reconciles otherwise contradictory demands of extreme matte opacity, undeviating matte boundary and absence of detrimental flare light effects.

According to the invention, the two areas on opposite sides of the boundary between the background and foreground parts respectively of motion pictures are separately printed with traveling mattes, by making a matte having one area essentially clear and the other area relatively opaque, and by making with this matte a master film having a picture in the area corresponding to the opaque area of the matte and a relatively opaque area corresponding to the clear area of the matte, both the matte and the master being made on stock in which the silver in the opaque area tends to grow across the boundary into the clear area, and the matte and master being so exposed and developed that growth of one substantially counteracts growth of the other, the extent of this growth being controlled such that the said areas are substantially in register at the said boundary so that the separate printing is substantially unnoticeable in the finished picture.

For the purpose of illustration a typical embodiment of the invention is diagrammatically shown in the accompanying drawings in which Fig. 1 is a flow diagram illustrating the interrelation of the various components of the herein described embodiment of the invention;

Figure 1:
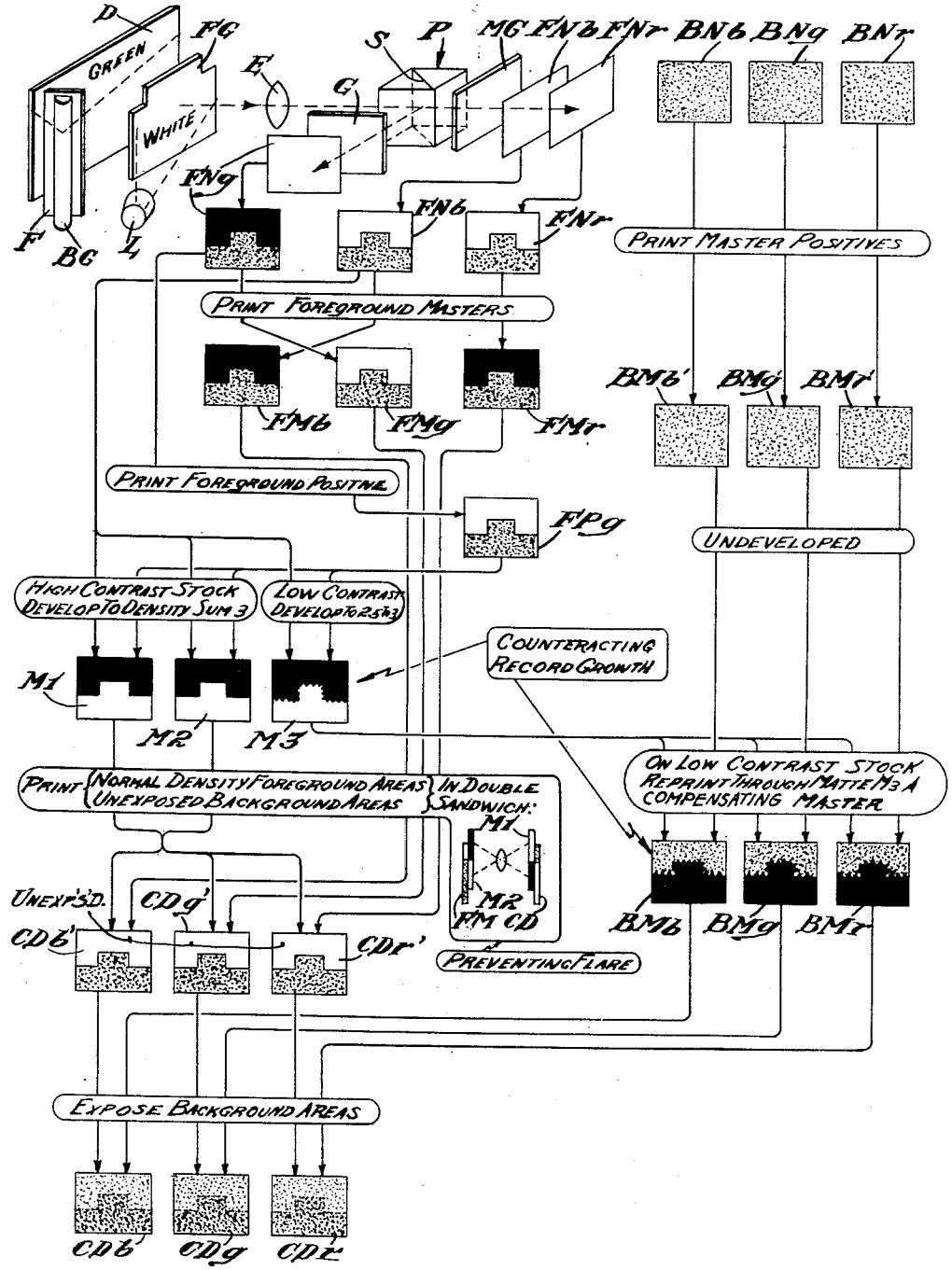

In the particular embodiment of the invention chosen for the purpose of illustration the foreground scene FG is illuminated with white light by a lamp L, against a backing D which may reflect the entire visible spectral range but should at least be fully reflective for green light, and which backing is illuminated as follows. A system of mercury vapor lamps, indicated by lamp BG, is arranged for full illumination of backing screen D through a filter F which is of the yellow appearing blue light absorbing type. As indicated in Fig. 2, mercury vapor lamps have particularly strong emission in two lines in the blue spectral range and in two narrow bands of the green range of the spectrum. As likewise indicated in Fig. 2, a filter (the approximate cut of which is shown at F) eliminates the violet and blue components so that the backing screen D is illuminated only with the strongly emitting green mercury lines. When three color separation negatives are made of a backing D illuminated with mercury vapor lamps filtered in this manner, behind a foreground FG illuminated with white light, optimum density difference between the background area of the blue aspect FN$b$ (compare Fig. 1, explained in detail below) record on the one hand and the background area of the green aspect record on the other hand is obtained. This density difference is at least 1.0 if the negatives are developed to gamma 0.7, with normal exposure on the foreground in both cases.

It should be noted that, as indicated in Fig. 2, the overlap of the effective sensitivity of commercially obtainable green and blue recording negative emulsions is such that for complete record separation as required in the technique according to the present invention, it is necessary that all of the exposure of the green record negative must come from wave lengths between 5,400 Angstrom and the upper end of the sensitivity range of the green recording emulsion $FNg$. In other words, in order to obtain maximum density difference between the background areas of the blue and green recording negatives, the green backing light must not expose the blue recording emulsion. Pigments or dyes of such sharpness of cut of reflection and transmission characteristics, respectively, are impractical, and spectral selection by such means alone is very inefficient and would require excessively high lamp energy. The principal green lines of vapor lamps emit a comparatively large amount of energy to which the green recording negative is sensitive and which does not overlap the sensitivity of the blue record negative. The effective sensitivity (that is the sensitivity range as determined by the photographic emulsion sensitivity as well as the camera and film filters) of emulsions commercially available for negative $FNb$ ends at 5,400, whereas that of $FNg$ goes down to 4,700. Hence if the 4,050 and 4,360 lines of mercury lamp are eliminated with the aid of filter F, optimum effective sensitivity relation of $FNb$ and $FNg$ is obtained. The wide separation of the 4,360 and 5,460 lines is made use of in this connection because it leaves considerable leeway for the cut of the minus blue lamp filter F which cut need not be very sharp, as indicated in Fig. 2, so that filter material which is otherwise desirable can be used for this purpose.

It should be noted and will be better understood from the description below that instead of filtering out the blue lines and recording the backing illumination on the green aspect negative, the green lines could be filtered out and the backing illumination recorded on the blue aspect negative. This principle is applicable for the extreme contrast differentiation of selected areas of any two color aspect records. Generally speaking it is possible to use, for the purpose of sharp color separation, comparatively widely separated emission bands of lamps of this type, correlated with the absorption characteristics of appropriate auxiliary filters and the effective sensitivity range of the recording film material.

The scene is photographed with a light-dividing camera of the type disclosed in Patent 2,000,058 which comprises a prism P having an internal light-dividing surface S, a lens system E and two film gates. Through one film gate passes a green sensitive film $FNg$ and through the other film gate passes a bipack comprising films $FNb$ and $FNr$ to record the blue and red aspects respectively. The green aspect film $FNg$ is exposed through a green filter G and, if film $FNr$ is effectively green sensitive, the other two films are exposed through a minus green filter MG. According to common practice one of films $FNb$ and $FNr$ of the bipack carries filtering material to prevent blue light reaching the red aspect negative $FNr$. It will be noted that the above mentioned patent shows the bipack in the reflected beam, whereas Fig. 1 shows it in the direct beam, a likewise feasible arrangement.

Figure 2:
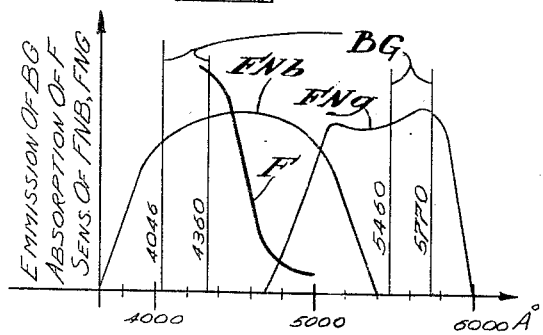
Fig. 2 is a diagram of the backing illumination also indicated in Fig. 1.

The blue, green and red aspects of the foreground scene are thus photographed and the latent records then developed to normal contrast on the three films as illustrated in Fig. 1. Inasmuch as the filter MG absorbs the green light from the backing and the combination of lamp BG and lamp filter F excludes from the backing any light to which film $FNb$ is sensitive, the background area of this film $FNb$ remains unexposed.

Due to intense illumination of the white backing with light to which film $FNg$ is particularly sensitive the green aspect negative $FNg$ is heavily overexposed in the background area. Fig. 1 illustrates the lack of exposure of the background area of film $FNb$ and the intense exposure of the corresponding area of $FNg$. Since film $FNr$ is little green sensitive or green light is excluded therefrom by filter MG, the background area of $FNr$ remains unexposed, as illustrated in Fig. 1.

From the three foregoing negatives $FNb$, $FNg$ and $FNr$, three positives, namely foreground masters $FMb$, $FMg$ and $FMr$ are printed as illustrated in Fig. 1.

From the green aspect negative $FNg$ a foreground positive $FPg$ is printed and developed in the usual way. Owing to the heavy density of the background area of the negative, this positive is clear in the background area, as indicated in Fig. 1.

With the blue aspect negative $FNb$ of the foreground and the green aspect positive $FPg$ of the foreground in superposition, three mattes M1, M2 and M3 are printed as illustrated in Fig. 1.

Inasmuch as the two printing films $FNb$ and $FPg$ are clear in the background areas the mattes can be heavily overexposed in these background areas without substantial exposure in the foreground areas. The two mattes M1 and M2 are printed on high contrast stock of the type usually employed for work of this type, for example film sold under the trade designation Eastman Matte Stock 1363 which is ordinarily processed to a gamma of 3.0 or greater. These films are developed to background area densities which are approximately normal for this type of emulsion such as about 1.5 but which, added together, total approximately 3.0 to 4.0.

The matte M3 is, in accordance with the invention, printed on low contrast stock such as customarily used in printing master positives, for example Eastman yellow-dyed Master Stock 2365 which normally develops to a gamma of 1.2 to 1.6. In accordance with the invention this film M3 is developed to a density in the neightborhood of 3.0. It is understood that the above densities are merely illustrative as to general order of magnitude but not critical.

The use of low contrast stock in making the matte M3 is contrary to the usual practice of making matte films, it being customary to use high contrast stock for that purpose, such stock being also used in the present example for mattes M1 and M2. The reason for the use of low contrast stock for matte M3 is the discovery that with such stock the developed silver along the border line between the heavily overexposed background area and the unexposed foreground area grows into the foreground area, thereby enlarging the size of the background area and correspondingly reducing the size of the foreground area. By purposely inducing such growth in the manufacture of this matte, an opposite growth in a later stage of the process, unavoidable if picture records of good quality are desired, is counteracted as hereinafter described.

The blue, green and red aspect negatives of the background, $BNb$, $BNg$ and $BNr$ in Fig. 1, may be made in any suitable way as for example by means of a camera such as illustrated in Fig. 1. From these negatives blue, green and red master positives $BMb'$, $BMg'$ and $BMr'$ are printed. Each of these three positive films is then reprinted upon by exposing it prior to development through the matte M3 to form on low contrast stock the background masters $BMb$, $BMg$ and $BMr$ respectively as shown in Fig. 1. Inasmuch as the master positives $BMb$, $BMg$ and $BMr$ are heavily overexposed in the foreground area and since they are on low contrast stock, the silver along the border line of the exposed area tends to grow into the background area as above described with reference to matte M3. This growth counteracts the growth involved in the manufacture of the matte M3 as illustrated in Fig. 1. If the respective growths are properly controlled, the opaque foreground areas of the master positives correspond in size to the foreground scene.

While the correlation of two matte systems such as M3 and masters BM by way of record growth in opposite sense may be fairly accurate without special control of this phase of the process so long as similar stock is used for both prints, it is particularly reliable if the record growth is controlled and correlated with the original optical image and a matte or mattes of the conventional type, in the manner now to be described with reference to Fig. 3 which employs a diagrammatical representation of record densities by way of record thickness.

Figure 3:
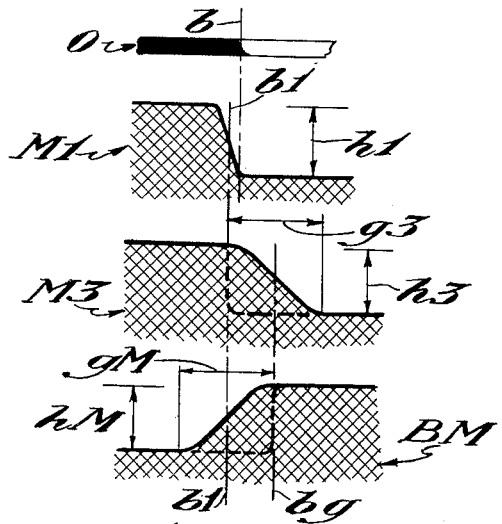
Fig. 3 is a diagram illustrating the record growth compensation according to the invention.

In Fig. 3, O symbolizes an optical image with a boundary $b$ which is for example the dividing line between foreground and background scenes as effectively defined by travelling mattes of the type herein dealt with. This boundary, if recorded on a conventional matte, is represented by the sharp silhouette outline b1 of such a matte, for example M1 described above with reference to Fig. 1. If a matte M3 is printed with the aid of an optical image derived from M1 or otherwise obtained, but generally equivalent to image O of Fig. 3, and this matte M3 is printed on low contrast stock as above described, record growth results. The growth corresponds to the single hatched triangular portion on the right-hand side of border line axis $b1$ of Fig. 3. This growth defines the effective boundary $bg$ of the photographic record M3, which boundary $bg$ is determined by values $g3$ representing the growth width, and $h3$ representing the density of the matte. It will be observed that boundary axis $b1$ and $bg$ do not coincide, which discrepancy corresponds to lack of register between mattes M1 and M3. If now a third matte record BM is printed with M3, $bg$ is the effective optical boundary of the image furnished by M3 for printing BM. If record growth is again involved, this growth will correspond to the single hatched triangular portion on the left-hand side of boundary axis $bg$. The effect of this growth is defined by dimensions $gM$ and $hM$. If the effective photographic record boundary of BM coincides with the effective boundary $b1$ of matte M1, the systems M1, M2 and BM are perfectly matched as will now be clear from Fig. 3. It is thus possible to use low contrast stock for printing the masters BM which contain not only opaque silhouette records but also background records of normal photographic gradation. It will be observed that substantially perfect matching involves correspondence of values $g3$, $h3$ on the one hand and $gM$, $hM$ on the other hand. By way of conventional exposure and development methods these values might be so selected that the effective photographic boundary of master BM coincides with the effectively correct matte boundary $b1$. For example if $gM$ is greater than $g3$, the difference between $b1$ and $bg$ would be too great, but this could be corrected by either changing the gamma of M3 or BM or by changing the density symbolized by dimensions $h3$ and $hM$.

From the three foreground masters FM$b$, FM$g$ and FM$r$ (Fig. 1) the masked records CD$b'$, CD$g'$ and CD$r'$ are printed through mattes M1 and M2 as illustrated in Fig. 1, thereby to produce latent records having normal density in the foreground areas and being unexposed in the background areas. The matte M2 is superposed over each master and the matte M1 is superposed over each masked record film, in sandwich form, during each of the three copying steps in a projection printer. The films CD$b'$, CD$g'$ and CD$r'$ are then exposed again to the background masters BM$b$, BM$g$ and BM$r$ to produce the final composite records CD$b$, CD$g$ and CD$r$ as illustrated in Fig. 1. These records may then be employed in any color process, as for example an imbibition process.

Figure 4:
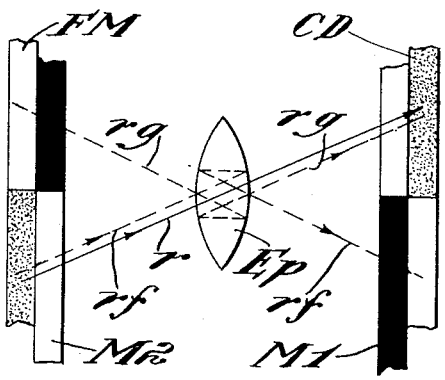
Fig. 4 is a diagram illustrating the printing step indicated in Fig. 1.

By employing two mattes M1 and M2 in printing the composite dupes as illustrated in Figs. 1 and 4 several advantages are obtained. In the first place heavy overexposure or heavy overdevelopment in making the mattes is unnecessary. On the contrary they may be printed lightly enough so that fine detail is not lost along the boundary between the foreground and background areas. When using a single matte which is necessarily heavily overexposed or overdeveloped, or both, much of this detail is lost. For example in the case of wisps of hair around a woman's head, the fine hairlines extending out into the background area are largely or entirely lost in the usual methods involving single matte. However with the present invention these stray wisps of hair print naturally even though surrounded by background scenery.

The two masks, each of fairly normal density but as pointed out above together of a density about 3.0 nevertheless furnish proper high density if used in superposition. In addition to the beneficial effects of providing high density and preserving fine detail, the use of two masks further provides the possibility of preventing or at least diminishing the effect of flare while printing records CD from masters FM. By using one matte in contact with a foreground master FM and the other in contact with the film CD, in the projection printed illustrated in Fig. 4, one matte prevents flare light from the background areas of the masters from affecting the foreground areas of the composite dupes, and the other matte which is used in the contact head prevents flare light from the foreground areas affecting the background areas as indicated in Fig. 4. In this figure E$p$ is the lens system of a projection printed. The arrangement of records FM, masks M1 and M2 and of stock CD will now be evident in view of the above description referring to Fig. 1. The full line ray $r$ indicates the actual printing beam, whereas the dotted ray $rf$ indicates the flare light which would impinge on the supposedly unexposed portion of CD if mask M1 were not present, whereas dotted ray $rg$ indicates the flare light which would impinge on the record portion of CD if mask M2 were not present.

The above described technique of combining two separately recorded picture portions with the aid of mattes can be applied in several modified ways in addition to that described above, and several such modifications will now be described with reference to Figs. 5 and 6.

Figures 5, 6:
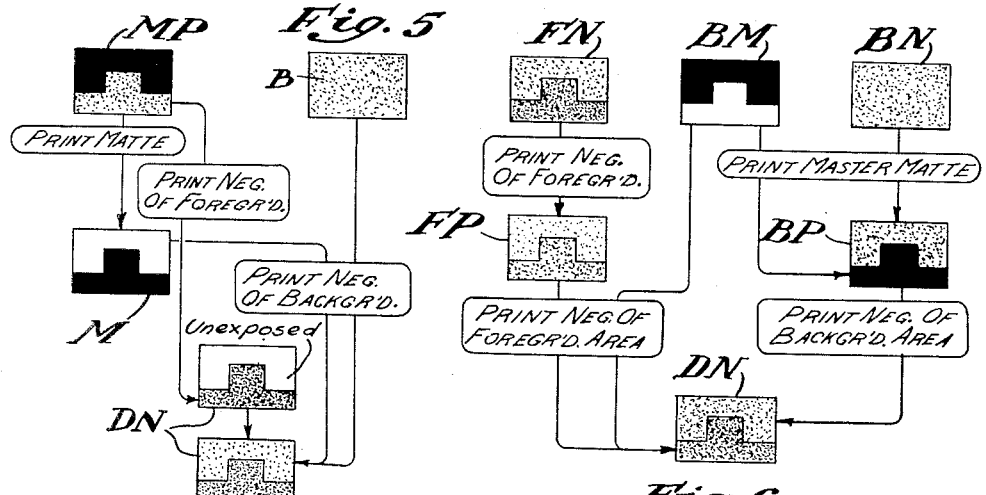
Figs. 5 and 6 are diagrams illustrating two additional embodiments of the single matte technique also indicated in Fig. 1.

In Fig. 5 MP represents a matte-picture in which the background portion of the picture area is opaque to serve as a matte and the foreground portion of the picture is in the form of a positive record of the foreground. M is a foreground matte made from the matte picture MP in the usual manner. B is a positive of the background scene. The resulting dupe negative DN is made by two printing operations. In one operation the foreground is printed from the matte-picture MP, this film serving as its own matte in preventing exposure of the background area of DN. The background is printed from the positive background film B in superposition with the foreground matte M. Thus to form the dupe negative only three films are required, the foreground film MP, the background film B and one matte film M, whereas in the usual procedure two matte films are required in addition to the foreground and background films.

There are various ways of forming the matte-picture MP. One method involves exposing the film to the foreground with a black background under-illuminated and then developing the film by the well-known reversal procedure so that the foreground record is a positive, the background area being opaque. If the foreground picture on MP is to be a negative instead of a positive a convenient procedure involves exposing the film to a foreground normally illuminated with a white background over-illuminated. Thus when the film is developed in the usual way a normal negative is attained in the foreground area and the background area is opaque.

Instead of combining a matte with the foreground picture, the matte-picture may comprise a background picture in the background area of MP and an opaque matte in the foreground area. This is the embodiment described above with reference to Figs. 1 to 4, wherein the separate matte, corresponding to M to Fig. 5 is opaque in the background area and transparent in the foreground area for use in printing on the composite picture only in the foreground area, the matte-picture background film having its own matte for use in printing the background area.

According to the procedure illustrated in Fig. 6 the foreground is recorded on the foreground negative FN, the background is recorded on a background negative BN, and a separate background matte BM is formed in any of the well known ways. From the foreground negative FN the foreground positive FP is printed in the usual way. With this foreground positive FP in superposition with the background matte BM the foreground portion of the dupe negative DN is printed, the background portion remaining unexposed. In separate printing operations the background positive BP is printed from BM and BN, so that when BP is developed in the usual way a positive of the background appears in the background area and the foreground area is opaque. Then the background can be printed on the unexposed portion of the dupe negative DN, from the film BP, without using a separate matte-film.

Instead of making the separate matte BM in the form of a background matte it may of course be a foreground matte, in which case it is used with FN instead of BN in forming a matte-picture comprising a picture in the foreground area and a matte in the background area. Instead of starting with negatives of the foreground and background, positives may be employed as in Fig. 5. To make the composite film DN of different sign from the starting films FN and BN, reversal development may be employed.

From the foregoing it will be evident that in each of the various embodiments of this phase of the invention only one matte-film is required, instead of two as usual, in addition to the foreground and background picture films. This not only reduces the number of films required but it also reduces the number of printing and developing operations required to produce the final composite picture.

It should be understood that the present disclosure is for the purpose of illustration only and that this invention includes all modifications and equivalents which fall within the scope of the appended claims.

I claim:

1. In the art of separately printing with traveling mattes the two areas on opposite sides of the boundary between the background and foreground parts respectively of motion pictures, the method which comprises making a matte having one area essentially clear and the other area relatively opaque, and with said matte making a master film having a picture in the area corresponding to the opaque area of the matte and a relatively opaque area corresponding to the clear area of the matte, characterized by making both the matte and the master on stock in which the silver in the opaque area tends to grow across said boundary into the clear area, by exposing and developing the matte and master so that growth of one substantially counteracts growth of the other, and by controlling the extent of said growths such that said areas are substantially in register at said boundary so that the separate printing is substantially unnoticeable in the finished picture.

2. In the art of separately printing with traveling mattes the two areas on opposite sides of the boundary between the background and foreground parts respectively of motion pictures, the method which comprises making a matte having one area essentially clear and the other area relatively opaque, and with said matte making a master film having a picture in the area corresponding to the opaque matte area of the matte and a relatively opaque area corresponding to the clear area of the matte, characterized by making both the matte and the master on stock in which the silver in the opaque area tends to grow across said boundary into the clear area, by exposing and developing the matte and master so that one growth substantially counteracts the other, by printing the picture area of said master on one of the areas of a composite duplicate film, and by printing the other area of the duplicate film through a matte which matches the matte area of the master, whereby said areas are substantially in register at said boundary so that the separate printing is substantially unnoticeable in the finished picture.

3. In the art of separately printing with traveling mattes the two areas on opposite sides of the boundary between the background and foreground parts respectively of motion pictures, the method which comprises making a matte having the foreground area essentially clear and the background area relatively opaque, and with said matte making a master film having a picture in the background area and being relatively opaque in the foreground area, characterized by making both the matte and the master on stock in which the silver in the opaque area tends to grow across said boundary into the clear area and by exposing and developing the matte and master so that one growth substantially counteracts the other, whereby said areas are substantially in register at said boundary so that the separate printing is substantially unnoticeable in the finished picture.

4. In the art of separately printing with traveling mattes the two areas on opposite sides of the boundary between the background and foreground parts respectively of motion pictures, the method which comprises making a matte having one area essentially clear and the other area relatively opaque, and with said matte making a master film having a picture in the area corresponding to the opaque area of the matte and a relatively opaque area corresponding to the clear area of the matte, characterized by making both the matte and the master on similar relatively low contrast stock in which the silver in the opaque area tends to grow across said boundary into the clear area and by exposing and developing the matte and master so that one growth substantially counteracts the other, whereby said areas are substantially in register at said boundary so that the separate printing is substantially unnoticeable in the finished picture.

5. In the art of separately printing with traveling mattes the two areas on opposite sides of the boundary between the background and foreground parts respectively of motion pictures, the method which comprises making a first matte having an opaque area reproducing said boundary essentially without deviation, making a second matte having one area essentially clear and the other area relatively opaque, and with said second matte making a master film having a picture in the areas corresponding to the opaque area of the mattes and a relatively opaque area corresponding to the light transmitting area of the mattes, characterized by making both the second matte and the master on stock in which the silver in the opaque area tends to grow across said boundary into the clear area and by exposing and developing the second matte and the master so that their relative growth restores their boundaries to that of said first matte, whereby said areas are substantially in register at said boundary so that the separate printing is substantially unnoticeable in the finished picture.

6. In the art of separately printing with traveling mattes the two areas on opposite sides of the boundary between the background and foreground parts respectively of motion pictures, the method which comprises making a first matte on relatively high contrast stock which has an opaque area reproducing said boundary essentially without deviation, making a second matte having one area essentially clear and the other area relatively opaque, and with said second matte making a master film having a picture in the area corresponding to the opaque areas of the mattes and a relatively opaque area corresponding to the light transmitting area of the mattes, characterized by making both the second matte and the master on similar relatively low contrast stock in which the silver in the opaque area tends to grow across said boundary into the clear area and by exposing and developing the second matte and the master so that their relative growth restores their boundaries to that of said first matte, whereby said areas are substantially in register at said boundary so that the separate printing is substantially unnoticeable in the finished picture.

7. In the art of separately printing with traveling mattes the two areas on opposite sides of the boundary between the background and foreground parts respectively of color motion pictures, the method which comprises simultaneously forming color separation negatives by exposing light sensitive emulsions with multicolored light from a foreground while the background area of one of said emulsions is intensely exposed with light of predetermined spectral range from a backing and while the other emulsions are normally exposed, making with one of said normally exposed negatives a first matte on stock which reproduces said boundary essentially without deviation, making with said intensely exposed negative a second matte having one area essentially clear and the other area relatively opaque, and with said second matte making a master film having a picture in the area corresponding to the opaque area of the mattes and a relatively opaque area corresponding to the clear area of the mattes, characterized by making both the second matte and the master on stock in which the silver in the opaque area tends to grow across said boundary into the clear area and by exposing and developing the second matte and master so that their relative growth restores their boundaries to that of said first matte, whereby said areas are substantially in register at said boundary so that the separate printing is substantially unnoticeable in the finished picture.

8. In the art of separately printing with traveling mattes the two areas on opposite sides of the boundary between the background and foreground parts respectively of color motion pictures, the method which comprises simultaneously forming color separation negatives by exposing light sensitive emulsions with multicolored light from a foreground while the background area of one of said emulsions is intensely exposed with light of predetermined spectral range from a backing and while the other emulsions are normally exposed, making with one of said normally exposed negatives a first matte on relatively high contrast stock which reproduces said boundary essentially without deviation, making with said intensely exposed negative a second matte having one area essentially clear and the other area relatively opaque, and with said second matte making a master film having a picture in the area corresponding to the opaque area of the mattes and a relatively opaque area corresponding to the clear area of the mattes, characterized by making both the second matte and the master on similar relatively low contrast stock in which the silver in the opaque area tends to grow across said boundary into the clear area and by exposing and developing the second matte and master so that their relative growth restores their boundaries to that of said first matte, whereby said areas are substantially in register at said boundary so that the separate printing is substantially unnoticeable in the finished picture.

9. In the art of separately printing with traveling mattes the two areas on opposite sides of the boundary between the background and foreground parts respectively of color motion pictures, the method which comprises simultaneously forming color separation negatives by exposing light sensitive emulsions with multicolored light from a foreground while the background area of one of said emulsions is intensely exposed with light of predetermined spectral range from a backing and while the other emulsions are normally exposed, making with one of said normally exposed negatives a first matte on relatively high contrast stock which reproduces said boundary essentially without deviation, making with said intensely exposed negative a second matte having one area essentially clear and the other area relatively opaque, and with said second matte making a master film having a picture in the area corresponding to the opaque area of the mattes and a relatively opaque area corresponding to the clear area of the mattes, characterized by making both the second matte and the master on similar relatively low contrast stock in which the silver in the opaque area tends to grow across said boundary into the clear area, by exposing and developing the second matte and master so that their relative growth restores the boundary of the master to that of said first matte, by printing the picture area of said master on one of the areas of a composite duplicate film, and by printing the other area of the duplicate film through said first matte which matches the matte area of the master, whereby said areas are substantially in register at said boundary so that the separate printing is substantially unnoticeable in the finished picture.

References Cited in the file of this patent

UNITED STATES PATENTS

| Number | Name | Date |
|---|---|---|
| 1,269,061 | Dawn | June 11, 1918 |
| 1,641,566 | Ball | Sept. 6, 1927 |
| 1,788,740 | Pomeroy | Jan. 13, 1931 |
| 1,802,530 | Pilny et al. | Apr. 28, 1931 |
| 1,897,494 | Mitchell et al. | Feb. 14, 1933 |
| 1,926,722 | Jackman | Sept. 12, 1933 |
| 1,960,373 | Dreyer | May 29, 1934 |
| 1,982,211 | Gillette | Nov. 27, 1934 |
| 2,024,081 | Williams | Dec. 10, 1935 |
| 2,028,975 | Gillette | Jan. 28, 1936 |
| 2,040,280 | Strecker | May 12, 1936 |
| 2,051,161 | Briel | Aug. 18, 1936 |
| 2,072,091 | Ball et al. | Mar. 2, 1937 |
| 2,130,777 | Planskoy | Sept. 20, 1938 |
| 2,232,144 | Sersen | Feb. 18, 1941 |
| 2,277,141 | Oliver | Mar. 24, 1942 |
| 2,461,127 | Pickley | Feb. 8, 1949 |

FOREIGN PATENTS

| Number | Country | Date |
|---|---|---|
| 444,435 | Great Britain | Mar. 20, 1936 |
| 657,869 | Germany | Mar. 16, 1938 |

OTHER REFERENCES

Trivelli et al.—Pages 407 through 410 of Photographic Journal, London, September 1922.

Trivelli—Page 687, of British Journal of Photography—1922 vol. 69.

Neblette, C. B. "Photography Principles and Practice" fourth edition—1942—published by Van Nostrand Co., New York city—Pages 381 through 384.